March 18, 1924. 1,487,437

L. J. BRUNE, SR

COMBINED VEHICLE JACK AND TIRE TOOL

Filed May 24, 1923

Inventor
L. J. Brune Sr.
By D. Swift
Attorney

Patented Mar. 18, 1924.

1,487,437

UNITED STATES PATENT OFFICE.

LOUIS J. BRUNE, SR., OF ALGIERS, LOUISIANA.

COMBINED VEHICLE JACK AND TIRE TOOL.

Application filed May 24, 1923. Serial No. 641,167.

*To all whom it may concern:*

Be it known that I, Louis J. Brune, Sr., a citizen of the United States, residing at Algiers, in the parish of Orleans, State of Louisiana, have invented new and useful Combined Vehicle Jacks and Tire Tools; and I do hereby declare the following to be a full, clear, and exact description of the invention, such as will enable others skilled in the art to which it appertains to make and use the same.

The invention relates to a combined vehicle jack and tire tool and has for its object to provide a device of this character which may be used as a jack or a rim contractor and expander, thereby allowing one tool to serve two functions.

A further object is to provide a rim contractor and expander comprising a main body in which is slidably mounted a threaded a shaft, a gear carried by said threaded shaft and rotated by a gear rotatably mounted on the body member thereby moving the 'shaft longitudinally. Also to provide the threaded shaft with a removable U-shaped rim engaging member adapted to engage over the flange of a split rim and the end of the body member with hooked member adapted to engage over flange of the split rim, whereby upon an inward feeding of the shaft a rim on which the device is disposed will be contracted.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
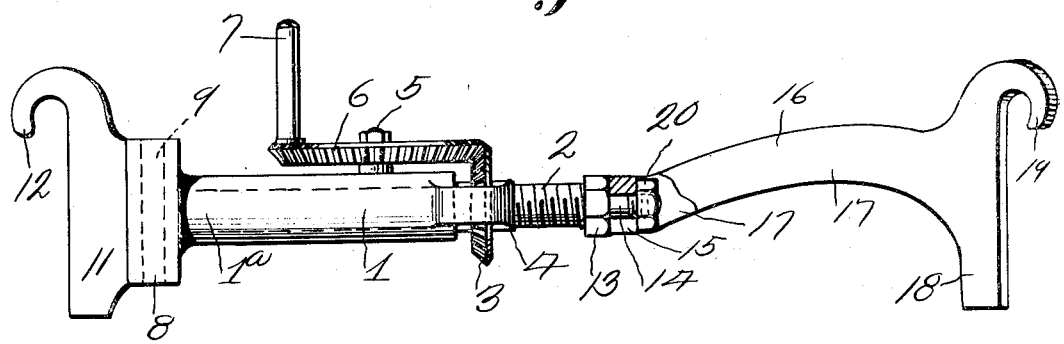
Figure 1 is a side elevation of the tool.
Figure 2:
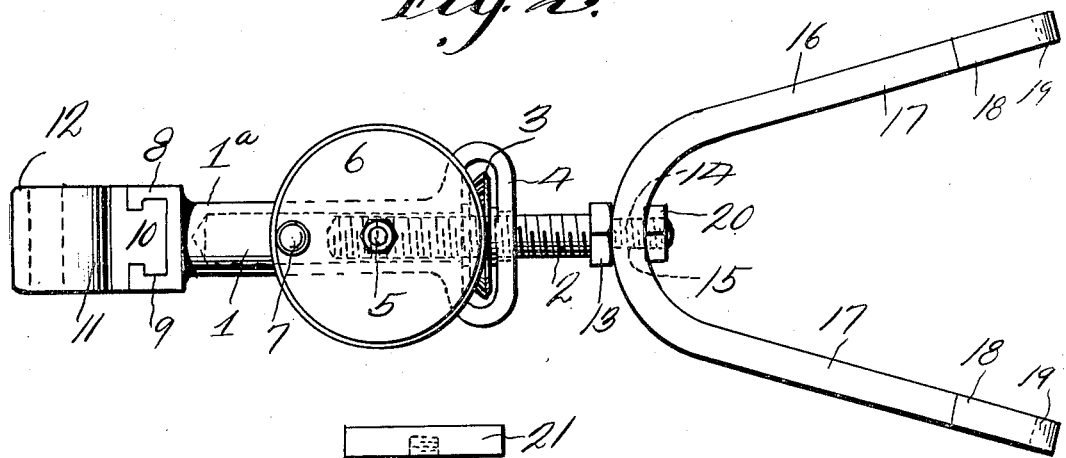
Figure 2 is a plan view of the tool.

Referring to the drawing, the numeral 1 designates a tubular body member in which is slidably mounted a threaded shaft 2. Threaded on the threaded shaft 2 is a bevelled gear 3, which bevelled gear is disposed in a yoke 4 carried by the tubular member 1. It will be seen that when the bevelled gear 3 is rotated that the shaft 2 will be fed inwardly or outwardly according to the direction of rotation of the bevelled gear 3 for lengthening or shortening of the device. Pivotally mounted on a stud 5 carried by the tubular body member 1 is a bevelled gear 6, which gear meshes with the bevelled gear 3 and when rotated, rotates the bevelled gear 3. The operator grasps the handle member 7 carried by the bevelled gear 6 when he operates the device. It will be seen that by providing the bevelled gear 3 on the threaded shaft 2, that when the device is supporting an axle or contracting a rim, retrograde movement of the shaft 2 is prevented and a special holding means for the shaft is not necessary. The end 1ª of the tubular body member 1 is provided with a transversely disposed member 8 having a transversely disposed T-shaped slot 9, which receives the T-shaped member 10 of a removable rim engaging member 11. The rim engaging member 11 is provided with a hook 12 adapted to hook over a demountable rim flange for contracting the rim adjacent the split thereof.

Disposed on the outer end of the threaded shaft 2 is a nut 13, which however may be a flange if so desired, and adjacent said nut 13 the shaft is provided with a reduced portion 14, which portion 14 is received in a recess 15 of a U-shaped member 16. The U-shaped member has its arms 17 diverging in relation to each other and terminating in transversely disposed portions 18, one of the ends of which is provided with hooks 19 adapted to hook over the flange of a demountable rim at spaced points with the transversely disposed portions 18 in engagement with the inner periphery of the demountable rim. It will be seen that when the threaded shaft 2 is fed inwardly in the tubular body member 1, a rim will be contracted thereby allowing a tire to be removed therefrom, consequently it will be seen that a rim contractor is provided, or an expander if desired.

Figure 3:
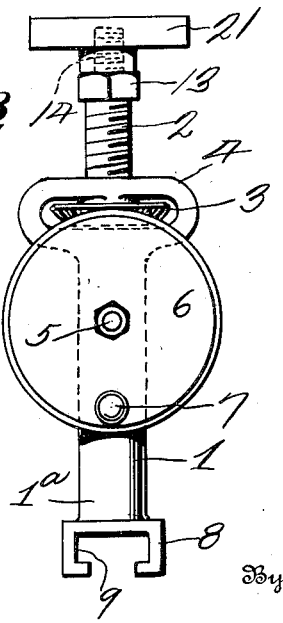
Figure 3 is a view showing the device converted to a jack.
Figure 4:
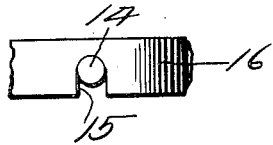
Figure 4 is a detail view showing a portion of the U-shaped rim engaging member and the end of the threaded shaft extending through a notch therein.

Referring to Figure 3 wherein a jack is shown, the jack is formed by removing the member 11 from the end 1ª of the tubular body member, and the U-shaped member 16 from the reduced portion 14 of the threaded shaft by loosening the nut 20 and moving the reduced portion 14 out of the recess 15. After the nut 20 has been removed an axle engaging member 21 is placed on the reduced portion 14, consequently the device may be used as a jack. It is to be understood that the bevelled gear 6 may be of any size desired in relation to the bevelled gear 3, and it may be rotated in any way desired by the handle member 7 or any other handle member.

From the above it will be seen that a combined rim contractor and expander and a jack which is simple in construction and one which may be easily and quickly applied and converted as desired is obtained.

The invention having been set forth what is claimed as new and useful is:—

1. A rim expander and contractor comprising a tubular body member, a threaded shaft slidably mounted within said tubular body member, means for feeding said threaded shaft into and out of the tubular body member, a removable rim engaging hook carried by one end of said tubular body member, a removable U-shaped member carried by the outer end of the tubular shaft, the arms of said U-shaped member terminating in rim engaging hooks, said rim engaging hooks at both ends of the contractor being carried at the ends of transversely disposed members.

2. A rim expander and contractor comprising a tubular body member, a threaded shaft slidably mounted within the tubular body member, a rotatable bevelled gear carried by one side of the tubular body member, a bevelled gear threaded on the threaded shaft and meshing with the first mentioned bevelled gear, a yoke carried by one end of the body member and in which the bevelled gear on the shaft is disposed, a transversely disposed rim carrying hook member having a dove-tail connection with one end of the tubular body member, a U-shaped member disposed on a reduced portion of the threaded shaft, arms carried by the U-shaped member, said arms terminating in transversely disposed members, rim engaging hooks carried by the ends of the transversely disposed members, the transverse portion of the U-shaped member being provided with a recess for the reception of the reduced portion of the threaded shaft.

3. A rim contractor comprising a tubular body member, a threaded shaft slidably mounted in said tubular body member, gear means for feeding said threaded shaft inwardly and outwardly, a rim engaging member having a dove-tail connection with one end of the body member and a U-shaped rim engaging member detachably connected to the outer end of the threaded shaft.

In testimony whereof I have signed my name to this specification in the presence of two subscribing witnesses.

LOUIS J. BRUNE, Sr.

Witnesses:
GLADYS BRUNE,
Mrs. JOHN T. LILES.